Sept. 5, 1961 Q. R. GLEASON ET AL 2,998,825
DEVICE FOR DISCHARGING ACCUMULATED WATER
Filed Jan. 30, 1956 3 Sheets-Sheet 1

INVENTORS
QUIN R. GLEASON
THEODORE F. W. MEYER
& ROBERT D. WILEY
BY Barnes Kisselle Laughlin & Raisch
ATTORNEYS Sept. 5, 1961    Q. R. GLEASON ET AL    2,998,825
DEVICE FOR DISCHARGING ACCUMULATED WATER
Filed Jan. 30, 1956    3 Sheets-Sheet 2

INVENTORS
QUIN R. GLEASON
THEODORE F. W. MEYER
& ROBERT D. WILEY
BY Barnes Kisselle Laughlin & Raisch
ATTORNEYS.

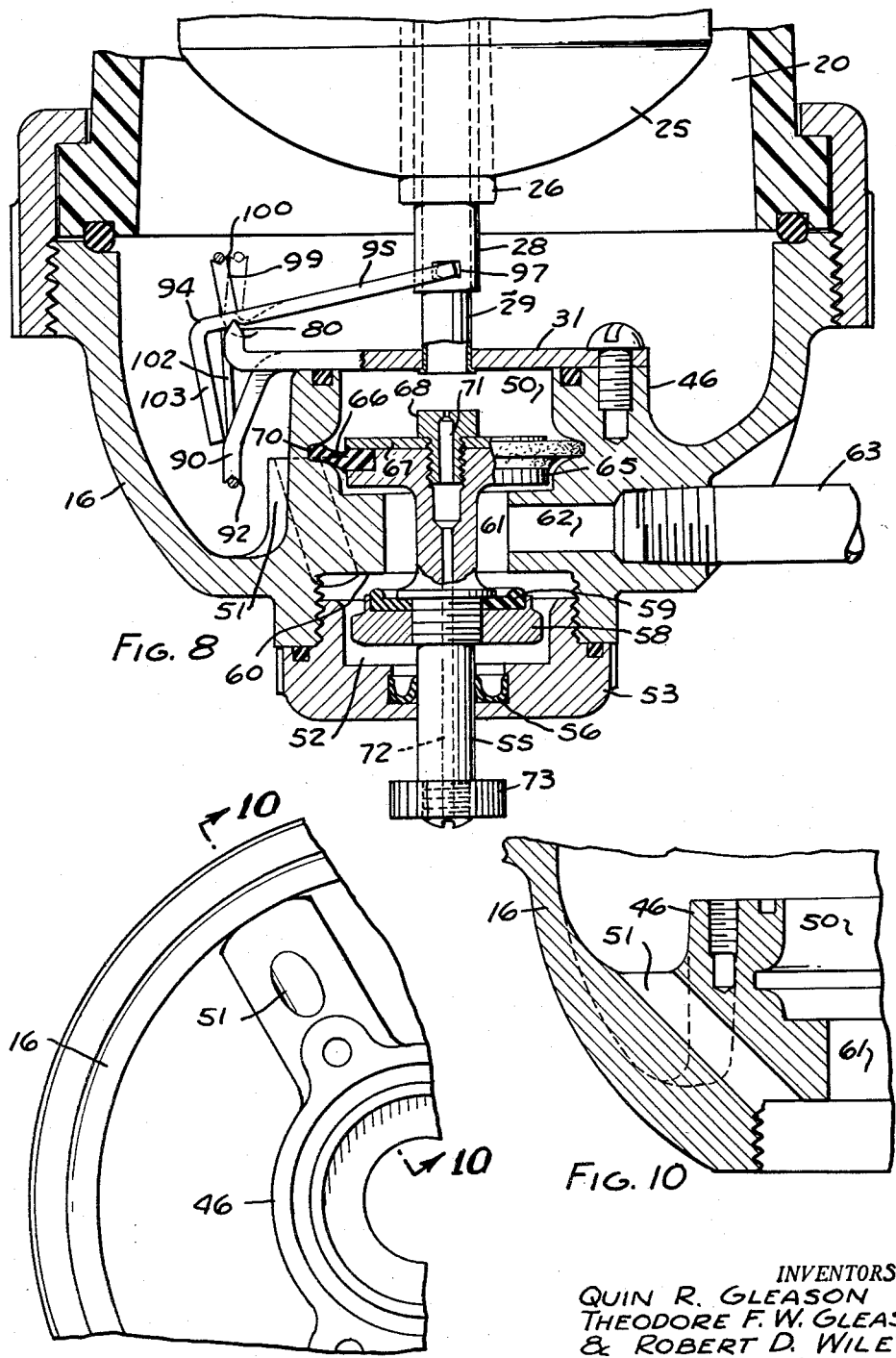

United States Patent Office 2,998,825
Patented Sept. 5, 1961

2,998,825
DEVICE FOR DISCHARGING ACCUMULATED WATER
Quin R. Gleason, Berkley, Mich., Theodore F. W. Meyer, Delray Beach, Fla., and Robert D. Wiley, Detroit, Mich., assignors to Master Pneumatic, Inc., Detroit, Mich., a corporation of Michigan
Filed Jan. 30, 1956, Ser. No. 562,209
9 Claims. (Cl. 137—195)

This invention relates to an automatically acting drain or discharging device for collecting and discharging accumulated liquids, principally water, from air pressure systems.

It is well appreciated that compressed air systems are used in many places, such as factories, for providing pressure for operating certain mechanism or pressure for other purposes, such as testing machines, cleaning machines and the like. Air under pressure is conducted from a suitable source by conduit to various places of use.

A serious factor which has to be dealt with in compressed air systems is that of the condensation of moisture and the resultant accumulation of water not only within the conduits but even more particularly in the storage and surge tanks, filters, and other vessels common to most all systems. Frequent periodic drainage of these vessels is essential to the proper functioning of the system.

The object of this invention is to provide an automatically acting discharge device which, as water accumulates in any air system conduit or vessel to which it may be attached, will discharge the same from time to time without requiring the attention of an attendant or operator. In accordance with the invention the device is provided with a chamber which collects the water and mechanism which operates when the water reaches a substantially predetermined level so that the water is discharged. In accordance with the invention a discharge valve is opened by the pressure in the compressed air system and it is closed by the pressure in the compressed air system and the condensate discharged entirely by said pressure, without the aid or supplement of a directly actuating or balancing springs or other extraneous mechanical impulsion. Moreover, the time cycle required for the opening of the discharge valve, the discharge of the water and the closing of the discharging valve is of such short duration as to be almost instantly.

A device constructed in accordance with the invention is disclosed in the accompanying drawings:

FIG. 8 is a view of the lower portion of the water receiving reservoir showing the discharge valve and associated parts.

FIG. 9 is a partial plan view of the bowl of the reservoir.

FIG. 10 is a sectional view taken on line 10—10 of FIG. 9.

Figure 1:
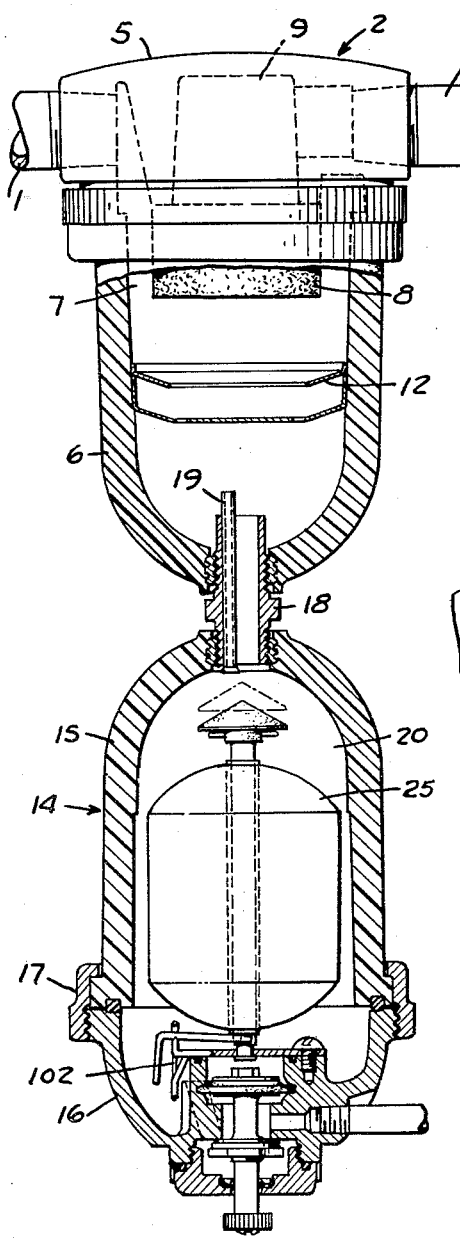
FIG. 1 is a view largely in section showing a filter and a sediment trap and a water discharge device.

The structure shown in FIG. 1 embodies a conduit 1 which, for the purposes of this invention, may be the inlet line to a filtering device generally illustrated at 2, and the conduit 3 is the outlet line from the filter. The details of the filter constitute no part of this invention and in lieu of a filter, a storage tank or any other familiar form of accumulating vessel common to pressurized air systems would be equally illustrative. Suffice it to say that the filter shown has a head 5 into which the conduits 1 and 3 connect and a bowl 6. The compressed air enters through the conduit 1, flows downwardly through a circumferential chamber 7 into the bowl and then flows upwardly through a filter 8 into a central passage 9 thence into the outlet conduit 3. Baffles 12 are disposed in the bowl 6 and sediment accumulates in the bottom of the bowl. Also, water accumulates in the bottom of the bowl.

The water ejector or discharge device, generally illustrated at 14, has an upper bowl portion 15 and a lower sub-bowl portion 16 which may be connected together by a threaded ring 17. The portion 15 may be of clear or opaque plastic or of metal. The ejector is positioned below the sediment bowl and is connected thereto by a suitable fitting or nipple 18 which preferably extends into and above the lower level of the sediment bowl as indicated. A tube 19 extends through and above the fitting 18 to equalize the pressures between the interior of the sediment bowl 6 and the chamber 20 within the ejector, and vent one to the other in a manner to avoid air-lock within fitting 18 of any liquid gravitating therethrough.

Figure 2:
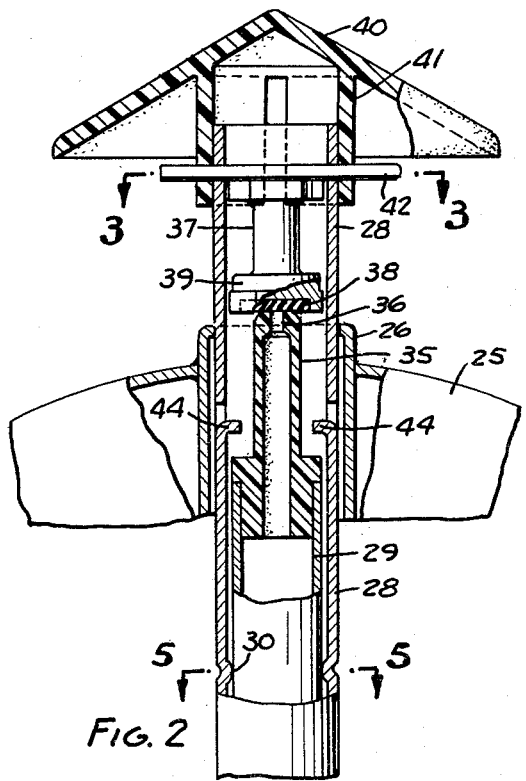
FIG. 2 is an enlarged view largely in section showing details of a port and its valve.

In the chamber 20 is a float 25 in the form of a metal shell, or other suitably buoyant material and construction, and extending through the center of the float is a tube 26 which is sealed to the shell or float body. The upper end of the tube 26 as well as the lower end thereof may have extreme end parts fashioned inwardly as shown in FIG. 2 for a free coaxially sliding engagement with a tube 28. Within the tube 28 is another tube 29 and the metal of the tube 28 may be indented to form projections 30 to provide for a nicety of coaxial sliding action between the tubes 28 and 29. The innermost tube 29 has its lower end securely fastened to a plate 31 which will later be considered. The tube 28 is axially shiftable relative to the tube 29 and relative to the tube 26 of the float, and secured separately or integrally to the upper end of the tube 29 (FIG. 2) is a member 35 provided with a small port 36. Within the tube 28 but in no manner attached thereto, is a valve member 37 having a sealing portion 38 molded into or otherwise adhesively embedded upon a head 39 for seating upon the end of the member 35 to close the port 36. The port member 35 and the sealing 38 may be of plastic substance such as nylon or other non-bonding, compatibly sealing materials.

Figure 3:
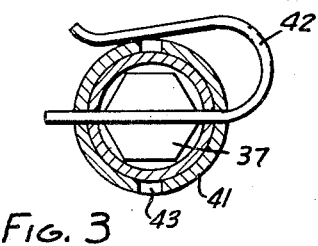
FIG. 3 is a sectional view taken on line 3—3 of FIG. 2.
Figure 4:
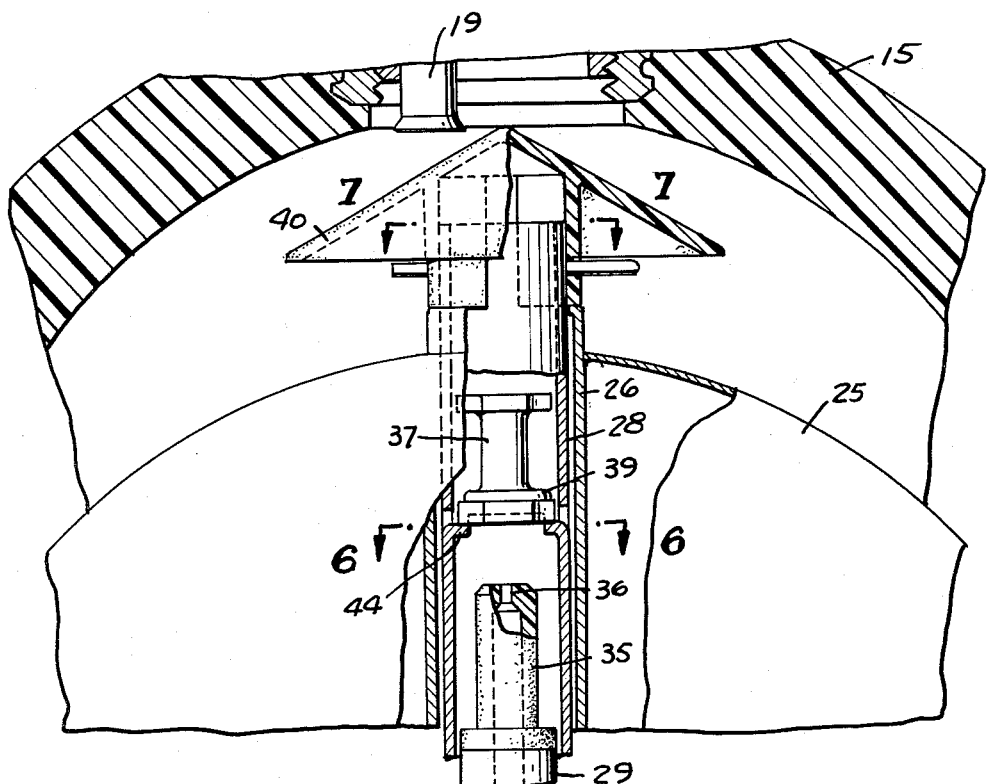
FIG. 4 is a view similar to FIG. 2 showing the parts in a different position.
Figure 5:
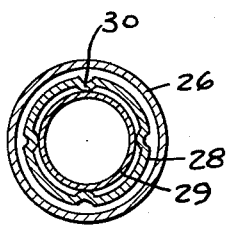
FIG. 5 is a sectional view taken substantially on line 5—5 of FIG. 2 showing telescoping tubes.
Figure 6:
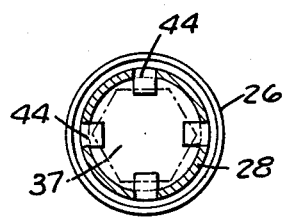
FIG. 6 is a sectional view taken on line 6—6 of FIG. 4 showing means for operating a valve member.
Figure 7:
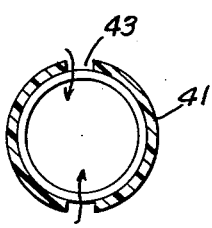
FIG. 7 is a sectional view taken on line 7—7 of FIG. 4 illustrating air passes.
Figure 12:
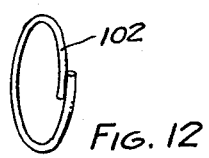
FIG. 12 is a view of the spring element.

On the top of the tube 28 is a deflector 40 having a flange 41 secured to the tube 28 by a suitable fastener 42 (FIG. 3). The fastener 42 also downwardly engages against the top of valve 37 when the mechanism is in the lowered position as in FIGS. 1 and 2, but in no manner attached thereto. The flange 41 (FIGS 3 and 7) has slots 43 formed therein to provide air passages. The tube 28 has inwardly directed projections or fingers 44 which may be formed by striking in the metal of the wall thereof and in the normal at rest position the projections 44 are spaced downwardly from the head 39 of the valve member 37 in a manner that tube 28 may axially rise a prescribed distance entirely independently of said valve. Normally, that is, when the discharge device is closed, the tube 28 is in a lowered position.

The bowl 16 is provided with an annular wall 46 which is closed and sealed by the plate 31. This provides a pressure chamber 50. Leading from the chamber 20 is one or more ports 51 which connect into a chamber 52 defined by a closure nut 53 screw threaded to the bowl 16. A valve member having a stem 55, extends through the nut 53 whereat there may be a sealing member 56. This stem carries a valve member 58 with a sealing washer 59 molded therein or otherwise adhesively embedded thereon. The washer 59 is arranged to engage valve seat 60 when in elevated position, as FIG. 8 is viewed. An outlet port 61 connects to an outlet passage 62 to which a suitable conduit 63 may be connected.

The stem 55 has a head 65, and a distortable elastomer sealing member, somewhat in the form of a washer and as illustrated at 66, has its inner peripheral edge held to the head 65 by a plate 67 secured to the head by a screw 68. The outer peripheral edge of the sealing washer seats and is in intimate peripheral contact with an annular internal groove 70 in the wall 46. The sealing member thus provides for limited axial movement of the stem 55 within the range of its possible axial float and deflection within groove 70. The screw 68, which may be centrally positioned relative to the head 65 has an appropriately restricted passage 71 therethrough and the stem 55 has a passage 72 extending therethrough and these passages constitute a bleed port to atmosphere the purpose of which is later evident. The lower end of the stem projects from the nut 53 and may be provided with an enlargement 73 for purposes which will presently appear.

Figure 11:
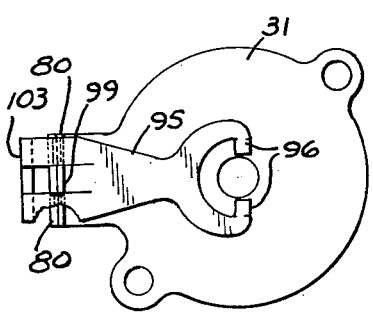
FIG. 11 is a plan view of a lever and also showing the mounting therefor.

There is a lever arrangement associated with the sleeve 28. For this purpose the plate 31 may have an extending and upturned bifurcated part forming two laterally aligned symmetrical knife edge fulcrum bearings 80 and a downwardly extending part 90 with a notch 92. A lever generally illustrated at 94 has one arm 95 of a bifurcated nature (FIG. 11) with inwardly extending trunnion members 96 which engage in opposite slots 97 in the lower end of the tube 28. The lever has an integrally formed upstanding part 99 provided with a notch 100 and otherwise so formed as to fit centrically within the bifurcation forming the fulcrum bearings 80 thereby centering trunnion members 96 on tube 29 and preventing any lateral shift of the lever upon the fulcrum bearings. A spring 102 loops over and engages in both notch 100 and the notch 92. The lever has a tail piece 103 arranged to engage against the downwardly projecting part 90 of the plate 31 and act as a stop to the upward movement of arm 95.

The arrangement and position of the fulcrums 80 relative to the fixed notch 92 and the notch 100, is that the movement of the notch 100 is over center, that is, from one side to the other of a line drawn through the notch 92 and the knife edge fulcrums 80. Thus when in the position shown in FIG. 8 the spring 102 tends to swing the arm 95 of the lever upwardly. Conversely when the tube 28 is down notch 100 has moved to the opposite side of the line through the notch 92 and fulcrums 80 so that the spring tends to urge the lever arm 95 and thus the tube 28 downwardly. This is illustrated in the dotted line position shown in FIG. 8. This position is also shown in FIG. 1.

In the operation of the device let it be assumed that the parts are in static or at rest position as shown in FIG. 1. In this position, the spring 102 is urging tube 28 downwardly, the fastener 42 is in engagement against the valve 37, and thus urging the sealing member 38 against the valve member 35 tending towards the closing of port 36. With little or no liquid in chamber 20 the float 25 is in its lowermost position shown in FIGS. 1 and 2. The pressure in the compressed air system is, of course, introduced into filter chamber 6 and, through fitting 18, into chamber 20 of the automatic drain. This pressure, through ports 51, is effective in chamber 52 causing a pressure differential therebetween and port 61, open to atmosphere, which causes an upward shift of valve head 58 and interconnected valve stem 55, which, without benefit of spring or other extraneous mechanical impulsion, causes sealing washer 59 to securely seat against member 60 and effect a pressure-sustained seal between chamber 52 and discharge port 61 thereby closing said port against any escape therethrough. At the same time the pressure within chamber 20 has access to valve member 37 and to the annular space between the tube 28 and the tube 29, through ports 43, whereas the underside of sealing member 38 is vented to atmosphere through tube 29, chamber 50, bleed orifice 71, and bleed port 72. Upon initial closure of port 36 by the downwardly urging engagement thereagainst of fastener pin 42 upon valve 37, and correlatively upon sealing member 38 against valve member 35, arising from the downward urging thereupon exerted by spring 102 through the successively interconnected therebetween lever arm 95 and tube 28, there exists, through the effect of said venting, a pressure differential upon valve 37 downwardly urging sealing member 38 towards a secure and thereafter independently pressure-sustained closure of port 36.

As condensate accumulates in filter bowl 6, or other vessel to which the device may be attached, it rises slowly towards the level of the upper end of the fitting 18, extended thereinto, meanwhile precipitating whatever heavier sediment it may carry to the surrounding sump area in the bottom of bowl 6. When its level reaches that of the upper end of fitting 18 it overflows thereinto and drips therethrough into chamber 20. The head 40 protects the underlying parts by diverting the drippings outwardly over the float dome thereby preventing them from flowing over and around valve 37 and associated parts, and from directly entering between the several tubes.

With each successive overflow stimulated by precipitation of condensate in bowl 6, the liquid accumulates and eventually rises within chamber 20 to enter and occupy the annular chamber between bowl 15 and float 25 to a level to impart flotation to float 25 to cause it thereafter to rise correspondingly to each successive rise of the liquid level. These successive rises may be relatively individually infinitestimal and at irregular intervals depending upon atmospheric and other conditions influencing condensation within an air system. It should be noted that float 25 is free to rise within limits independently of, and without imparting any motion to, any other part of the mechanism, since its central tube 26 is freely and independently slidable, within limits, upon tube 28. This permits a substantial and predetermined volume of liquid to be accumulated within chamber 20 before float 25 rises to a point where the upper end of its tube 26 meets, engages, and is arrested from further immediate rise by the lower face of flange 41, secured to tube 28 by fastener 42, due to the downwardly urging force exerted on tube 28 by spring 102 through interconnecting lever arm 95. As the water level in chamber 20 may rise thereafter from succeeding overflows, it imparts to the thereby arrested float a progressively increasing buoyancy which places a correspondingly progressively increasing upward load upon flange 41 and therethrough upon tube 28. However, tube 28 and interconnected structure remain at rest until the so stored buoyancy of float 25 accumulates a magnitude from successive liquid rises to exert an upwardly force upon flange 41, and coincidently upon tube 28, sufficient to overbalance the downwardly urge of spring 102 upon the related mechanism and thereby cause tube 28 to start to move upwardly drawing with it lever arm 95 about fulcrums 80 and moving spring point 100 towards, and over, the centerline.

As the spring point 100 passes over the centerline, spring 102 imparts, through arm 99, a sudden upwardly snap-action to lever arm 95 which, in turn, correspondingly impels tube 28 upwardly with a snap-like motion causing projections 44 therein to strike and engage valve 37 with a kinetic impact sufficient to overbalance the downwardly force of chamber 20 pressure thereon and lift valve 37 from member 35 to open port 36. Simultaneously float 25, relieved of downward restraint upon its accumulated buoyancy, instantaneously follows tube 28 upwardly to the high limit of its possible movement, as determined by engagement of member 103 with member 90, in a measure augmenting the upwardly movement of tube 28 and the then engaged therewith valve 37. As this movement occurs, the line pressure within chamber 20, which, as aforestated, has access to the interior of tube 28, passes instantaneously through port 36, down through tube 29, into chamber 50. Although some of the pressurized air thus introduced into chamber 50 may bleed directly to atmosphere through passages 71 and 72, the rate of such escape is so metered by the restriction of passage 71 relatively to the area of part 36 that a residium pressure remains captive within chamber 50 of a magnitude to establish appropriately opposing, though not necessarily equal, pressures within chambers 50 and 52, respectively active against members 65 and 66 on one hand and member 58 on the other hand. As members 65 and 66 are of combined aspect area appropriately greater than the aspect area of member 58, there is established a differential of force upon the valve structure which moves valve stem 55 downwardly to the position shown in FIG. 8.

With valve 59 now in open position the line pressure, acting through chamber 20 upon the surface of the liquid accumulation therein, impels the accumulation through ports 51 and chamber 52 into discharge port 61 to be received therefrom by conduit 63 and conducted to a suitable place of final disposal.

Since the described ejection is by full line pressure the discharge through the respective passages and chambers is at high-velocity permitting the ejected liquid to carry with it any fluent sludge without obstructive lodgement thereof within any of the passages or chambers, or other impediment of the mechanism as a whole.

When discharge occurs, float 25 is necessarily relieved of liquid support and drops sharply by gravity towards its lowered position. As it so drops the lower end of its tube 26 encounters and engages the trunnion ends of bifurcated lever arm 95 with a kinetic impact sufficient to swing lever arm 95 contrarily against the upwardly urging force thereon of spring 102. As the downward drive of float 25 swings lever arm 95 downwardly it correspondingly moves spring point 100 over center and exerts a downwardly urge on tube 28. When spring mounting point 100 moves over center, spring 102 again acts through lever arms 99 and 95 to draw and hold tube 28 to its extreme downward position, coincidently pulling valve 37 downwardly, through re-engagement therewith of fastener 42, with velocity and force to bring sealing member 38 securely to rest against member 35 and substantially close port 36 against further passage of pressurized air therethrough in volume requisite to sustain a pressure residium within chamber 50 of magnitude necessary to hold valve 58 open against the line pressure active upon its underside.

Upon the initial closure of port 36, the pressure in tube 29 and chamber 50 bleeds down rapidly to amospheric through passages 71 and 72 whereupon the system pressure acting upon valve member 58 moves valve stem 55 upwardly to establish a pressure-sustained closure of port 61 against further discharge therethrough. At the same time the system pressure exerts its full force downwardly on valve 37 to complete, and thereafter sustain, a hermetical closure of port 36 against any leakage or bleed therethrough until it may again be opened by an upwardly snap-action of tube 28 upon a normal repetition of the aforedescribed operating cycle. At this point a complete cycle of operation is concluded with the discharge phase thereof taking place so rapidly that the accumulation in chamber 20 is disposed of almost instantly.

It should be obvious from the foregoing that, within broad limits, neither line pressure nor rate of liquid accumulation have any bearing upon the functioning of the mechanism other than as the line pressure may influence relative discharge velocity, and as the rate of liquid accumulation may prescribe the frequency of operation. Within designed capacity limits the volume of discharge holds relatively constant and the mechanical actuation uniform at all pressures within the rated minimum/maximum range. Furthermore both valves being entirely independent of other than air pressure to secure and hold their respective closures operate positively and automatically with requisite concord. Repetitive cycles occur with each successive appropriate accumulation of liquid.

Separately from the described automatic operation thereof, the discharge valve may be manually operated at will through the means of finger piece of handle 73 irrespective of accumulated liquid level. Thus an attendant or operator may grasp handle 73 either by hand or by suitable tool and with appropriate downward pressure thereon effect a partial or complete discharge whenever desirable. This provides for a quick, convenient "blow-off" which may be performed at any time for purpose of dislodging scale or other extraneous matter which may momentarily deposit and entrap between valve seal 59 and valve seat 60. In cases where leakage through discharge valve is noted it is most usually indicative of such lodgement. One or two quick manual manipulations of the discharge valve usually suffice to "blow-out" the offending foreign matter thus forestalling dismantlement of the structure and the attendant pressure interruption otherwise required for cleansing. Such manual manipulation moves only the discharge valve and does not in any way disturb the setting and status of the remaining structure excepting to cause float 25 to gravitate to whatever position the remaining liquid level may dictate, whence it resumes its corresponding progressive functioning within a normally progressive cycle of operation.

We claim:

1. A device for collecting and discharging water from a compressed air system comprising a vessel constituting a sump and connected to a compressed air conduit and having an outlet passage in its lower portion defined by a valve seat, a shiftable discharge valve member having a seal for engaging the seat, the valve member having a first head acted upon by pressure in the vessel to seat the seal and close the outlet passage, a second head on the valve member larger than the first head and positioned in a chamber, conduit means having a port for connecting the chamber with the interior of the vessel, an operating valve normally closing said port, bleed passage means for bleeding the chamber to atmosphere so that the discharge valve is normally closed, a float in the vessel having a tube extending vertically through its central portion, an operating tube slidably within the tube of the float, said conduit means comprising a tube positioned within the operating tube and the port being at the top thereof, a lever with an over center spring connected to the lower end of the operating tube, means on the operating tube engageable by the float upon rise of the float to a given level to shift the operating tube and move the spring over center, whereby the spring shifts the operating tube upwardly, means on the operating tube for engaging the operating valve to lift it and open the said port for the transmission of air to the chamber, whereby the air pressure on the larger second head actuates the discharge valve member and opens the outlet passage so that accumulated water is blown through the outlet passage by air pressure in the vessel, a part engageable by the float as the float gravitates to its lower position to shift the lever and operating tube and move the spring over center, so that the spring urges the operating tube downwardly, and means on the operating tube for engaging the operating valve and urge it to close the port.

2. A device for collecting and discharging water from a compressed air system comprising a vessel constituting a sump and connected to a compressed air conduit and having an outlet passage in its lower portion defined by a valve seat, a shiftable discharge valve member having a seal for engaging the seat, the valve member having a first head acted upon by pressure in the vessel to seat the seal and close the outlet passage, a second head on the valve member larger than the first head and positioned in a chamber, a fixed upstanding tube connecting into the chamber having a port at its upper end, an operating tube slidably positioned around the fixed tube, an operating valve slidable within the operating tube above the fixed tube for normally closing said port, a float having a center tube slidably positioned around the operating tube, an over center lever and spring assembly connected to the lower end of the operating tube for urging the operating tube downwardly, means on the operating tube for engaging the operating valve to hold it in port closing position when the float is at a downward position, means on the operating tube spaced above the float and engageable thereby to be actuated by the float when the float rises to a given level to shift the operating tube upwardly and to shift the lever and spring assembly over center, whereby the spring and lever assembly shifts the operating tube upwardly, means on the operating tube spaced downwardly from the operating valve to engage and shift the operating valve to open the port for the transmission of air to the chamber, whereby air pressure on the larger second head actuates the discharge valve to open the outlet passage so that accumulated water is blown through the outlet by air pressure in the vessel, and a part engageable by the float when it gravitates to its lower position to actuate the lever and spring assembly over center and urge the operating tube downwardly and the operating valve to port closing position, and means providing a bleed passageway from said chamber to the atmosphere whereby the chamber pressure bleeds to atmosphere and the pressure in the vessel closes the discharge valve.

3. A device for collecting and discharging water from a compressed air system comprising, a vessel constituting a sump connected to a compressed air conduit, the extreme lower end of the vessel having a first chamber in communication with the interior of the vessel, a discharge passage above said chamber defined by a valve seat, a discharge valve, a first head on the discharge valve having a seal for engaging said seat, whereby the outlet passage is closed by the pressure in the vessel, the vessel having a chamber above the outlet passage, a second head on the discharge valve positioned in the second chamber and being larger than the first head, seal means between the second head and the walls of the second chamber of a type for permitting movement of the discharge valve member, bleed passage means for bleeding the second chamber to atmosphere, a conduit fixed to and extending upwardly from said chamber, and having a port at its upper end, an operating conduit slidably positioned around the fixed tube, a float having a central tube slidably exposed around the operating tube, an operating valve within the operating tube and above the fixed conduit, operating means connected to the lower end of the operating tube for holding the operating tube downwardly when said float is in a low position, means on the operating tube for engaging the operating valve to hold it against the end of the fixed conduit for closing said port, means on the upper end of the operating tube engageable by the float, when the float rises to a given level, to shift the operating tube upwardly and actuate the operating means and move the operating valve to open said port for transmission of air to the second chamber, whereby the air pressure on the larger second head actuates the discharge valve to open the outlet passage so that accumulated water is blown through the outlet passage by air pressure in the vessel, said operating means having a part engaged and actuated by the float as the float gravitates to its lower position to move the operating tube downwardly, and means on the operating tube for engaging the operating valve to urge the operating valve against the fixed conduit to close said port, whereby the second chamber bleeds to atmosphere and pressure in the vessel closes the discharge passage.

4. The device as recited in claim 3 characterized in that the operating means is an over center lever and spring assembly which holds the operating tube downwardly when said float is in a low position, and which is tripped over center by the float as the float rises to said given level, whereby the water is blown from the vessel substantially instantaneously, said over center spring and lever system being actuated over center as the float gravitates to lower position whereby the forces on the operating tube are downwardly.

5. The device as described in claim 4 characterized in that the operating tube has means for engaging the upper end of the operating valve to hold it in port closing position, and inwardly projecting means on the operating tube normally spaced below the operating valve when the operating tube is in lower position and engageable with the operating valve to lift it to port opening position when the elevated float operates the over center spring and lever assembly.

6. A device for collecting and discharging fluid from a compressed air system or the like comprising, means forming a vessel adapted to be connected into a compressed air system and having an outlet for accumulated fluid, pressure operated valve means exposed on one side to pressure in said vessel and being operative responsively to said pressure to close said outlet, control means including means defining a pressure-containing chamber one wall of which effectively comprises the other side of said pressure operated valve means, said control means also including means providing a control valve operable to introduce vessel pressure into said chamber, means forming a float movable in said vessel independently of said control valve, operating means having a lost motion operative connection to said float and said control valve, over-center spring means operably connected to said operating means so that said operating means tends to hold said control valve in closed position when said float is in a lower position for excluding vessel pressure from said other side of said valve means, said float and operating means having means which interengage when said float rises to a given level and which resist further rising of said float, said float being operative to exert increasing buoyant force on said operating means through said interengaged means incident to continued rise of the fluid level in said vessel, said force being sufficient when the fluid reaches a given level to influence said operating means for tripping said over-center spring means whereby suddenly to release said operating means for rising movement, said operating means being operable upon said rising movement thereof to open said control valve for introducing vessel pressure on said other side of said valve means, said valve means being operable responsively to pressure introduced at said other side thereof to open said outlet so that accumulated fluid in said vessel is discharged therethrough at least in part by said vessel pressure, said float being operative upon lowering to reset said over-center spring means, said operating means being lowerable responsively to resetting of said over-center spring means to facilitate closing of said control valve, and vent means for relieving pressure in said chamber.

7. The device defined in claim 6 wherein said over-center spring means is operative to urge said operating means upwardly when said over-center spring means is tripped to release said operating means.

8. The device defined in claim 6 wherein said valve means includes a stem element having two spaced apart head portions with their oppositely outwardly facing portions defining said one side and said other side of said valve means, said outlet being disposed between the inwardly facing portions of said heads.

9. A device for collecting and discharging fluid from a compressed air system or the like comprising, means forming a vessel adapted to be connected into a compressed air system and having an outlet for accumulated fluid, pressure operated valve means exposed on one side to pressure in said vessel and being operative responsive to said pressure to close said outlet, control means including means defining a pressure-containing chamber one wall of which effectively comprises the other side of said pressure operated valve means, said control means also including means providing a control valve operable to introduce vessel pressure into said chamber, means forming a float movable in said vessel independently of said control valve, movable control valve operating means operably interposed between said float and control valve, reversible biasing means in one position urging said operating means in a direction for closing said control valve to exclude vessel pressure from the other side of said valve means, said biasing means in another position thereof urging said operating means in a direction for opening said control valve, said float and operating means having means which interengage when said float rises to a given level and which resists further rising of said float under the action of said biasing means in said one position thereof, said float being operative to exert increasing buoyant force on said operating means incident to continued rise of fluid level in said vessel, said force being sufficient when said fluid reaches a given level to overcome said biasing means and shift it to said other position to facilitate movement of said operating means for opening said control valve to introduce vessel pressure to the other side of said valve means, said valve means being operable responsive to pressure introduced at said other side thereof to open said outlet so that accumulated fluid in said vessel is discharged therethrough by said vessel pressure, said float incident to lowering upon discharge of fluid from the vessel being operable to shift said biasing means toward said one position thereof to facilitate return of said operating means for closing said control valve, whereby to close said outlet, and vent means for relieving pressure in said chamber.

References Cited in the file of this patent

UNITED STATES PATENTS

| | | |
|---|---|---|
| 2,493,474 | Breese | Jan. 3, 1950 |
| 2,606,543 | Rappl | Aug. 12, 1952 |
| 2,707,483 | Shafer | May 3, 1955 |
| 2,726,732 | Faust et al. | Dec. 13, 1955 |
| 2,744,534 | Faust | May 8, 1956 |
| 2,856,949 | Branson | Oct. 21, 1958 |